Patented Apr. 3, 1945

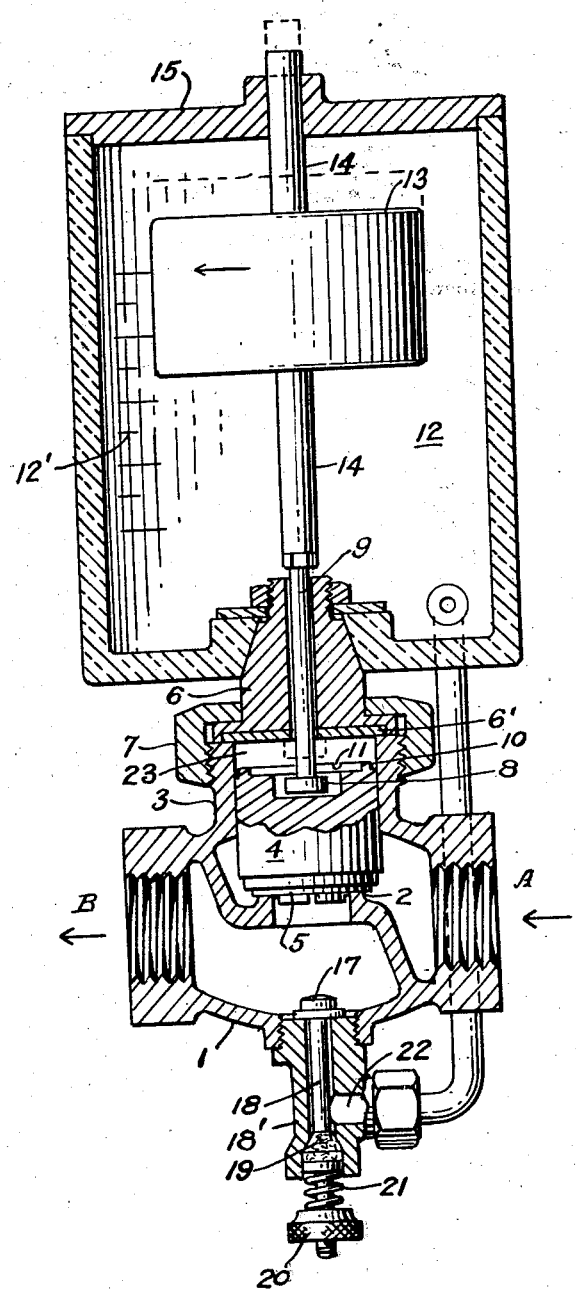
April 3, 1945.  J. F. MOLLOY  2,372,729
AUTOMATIC VALVE
Filed July 29, 1943
INVENTOR
JAMES F. MOLLOY
BY
ATTORNEY.

2,372,729

UNITED STATES PATENT OFFICE 2,372,729

AUTOMATIC VALVE

James F. Molloy, Oakland, Calif.

Application July 29, 1943, Serial No. 496,663

3 Claims. (Cl. 137—139)

This invention relates to improvements in automatic valves and more particularly to float controlled valves.

Among the objects of the invention is the provision of means for automatically timing the closing of fluid service valves.

Another object is the simplification of the structure and operation of valves in this class.

A further object is easy accessibility of all the parts of the structure liable to be rendered inoperative by obstructive matter suspended in the pressure medium.

This valve is designed particularly to control the time period of the cycle of operation of lawn sprinkler systems for gardens, golf courses and extensive areas where under or over irrigation may cause serious damage. In overhead irrigation it is often desirable to irrigate for two or more hours over a given area, then move the sectional supply lines to new areas. Because of the labor involved in servicing many acres, manual control of the water flow is not reliable, except by such additional automatic means as provided by the present invention.

Other objects and advantages will appear as the description progresses.

In this specification and the accompanying drawing the invention is disclosed in its present preferred form. But it is to be understood that it is not limited to this form; because it may be embodied in modifications within the spirit of the invention as defined in the claims following the description.

The one sheet of drawings shows a vertical section of a valve constructed in accordance with this invention. The dotted lines indicate the position of the float when the service is automatically stopped.

In detail the construction illustrated in the drawing comprises the globe type valve body 1, having the partition with the valve seat 2 therein. The neck 3 of the body has the piston valve 4 slidable therein and provided with the soft insert 5 adapted to close the valve seat 2 surrounding the center opening in the partition.

The top of the neck is closed by the plug 6 that is flanged and secured to the body by the coupling nut 7. The plug has the gasket insert 6' that seals the top of the neck against leakage. This gasket also acts as a soft seat for the valve 8 having the stem 9 extending upwardly through the plug 6. The piston 4 has the annular rim 10, that also seats against the gasket 6', stopping leakage upward in operative condition when the valve at 2 is open, except for the small gap or notch in the rim at 11. This gap acts as a spew valve permitting a slow leakage past the stem 9 into the reservoir 12 fixed to the top of the plug. This reservoir may be formed integrally with the plug 6, instead of being assembled therewith as shown. It is desirable to form the wall of this reservoir of a suitable transparent plastic, permitting visual evidence of the amount of water accumulated therein. This wall also has the graduated scale 12' thereon for an accurate check of the desired water level.

The float 13 is frictionally slidable on the guide rod 14, forming an extension of the stem 9 for adjusting the time cycle of operation. This rod is centered in a guide hole in the cover 15 on top of the reservoir wall. When the float 13 rises to the limit of its adjusted position, it lifts the valve 8 and stops the flow into the reservoir.

The stop valve 17 is mounted on a stem 18 guided in the T fitting 18' screwed into the bottom of the valve body 1. This valve seats against the top of the fitting 18'. The stem passes through the packing 19 and terminates in the knurled nut 20 which controls the tension of the spring 21 interposed between the nut and the packing for maintaining the valve 17 normally closed. The fitting has the bypass 22 for draining the reservoir 12 above. For outdoors installations this bypass need not be connected with the outlet neck at B, since there is no objection to draining the reservoir on the ground beneath.

This invention operated substantially as follows: The flow through the valve body 1, from A to B is normally closed by the pressure entering at A, filling the chamber 23 and reservoir 12 and forcing the piston 4 downward to seat at 2.

The flow through the outlet B is started by manually lifting the valve 17 and draining the float reservoir 12 through the bypass 22 and relieving the pressure in the chamber 23, permitting the pressure at A to lift the piston 4 and unseat the valve at 2.

The pressure at A continues to flow through the spew gap 11 until the float chamber again fills up to the adjusted capacity, determined by the adjusted position of the float 13. This closes the valve 8 permitting the pressure to again accumulate in the chamber 23 until the piston 4 is forced down, closing the valve at 2.

Should it be desired to stop the flow through B intermediate the operating cycle, the valve 17 can be lifted, permitting the reservoir to fill through the bypass 22. When the reservoir 12 is thus filled by manual intervention in the normal cycle of operation, the float 13 rises, closing the valves 8 and 2, which automatically shuts off the supply from the outlet B to the bypass 22, even if the valve 17 is still open, which would drain the reservoir.

Having thus described this invention what is claimed and desired to secure by Letters Patent is:

1. A valve in the class described, comprising a valve body having inlet and outlet necks and a cross partition with a valve opening therethrough; a piston valve slidable in a cylinder in said body in alinement with said opening; a reservoir with a base closing the top of said cylinder and having a guide hole therethrough; a valve adapted to close said hole and having a stem extending therethrough; a float on said stem within said reservoir and a bypass from said outlet neck directly to said reservoir and having a stop valve therein.

2. A valve in the class described, comprising a valve body having inlet and outlet necks and a cross partition with a valve opening therethrough; a piston valve slidable in a cylinder in said body in alinement with said valve opening; a reservoir with a base closing the top of said cylinder and having a guide hole therethrough discharging into said reservoir; a gasket interposed between said base and the top of said cylinder; a stem extending through said guide hole and having a valve thereon seating against said gasket; a float on said stem within said reservoir; and a bypass from said reservoir to said outlet neck and having a stop valve therein.

3. A valve in the class described, comprising a valve body having inlet and outlet necks and a cross partition with a valve opening therethrough; a piston valve slidable in a cylinder in said body in alinement with said valve opening and having a flow retarding spew gap in its upper end; a reservoir with a base closing the top of said cylinder and having a guide hole therethrough discharging into said reservoir; a gasket interposed between said base and the top of said cylinder; a stem extending through said guide hole and having a valve thereon seating against said gasket; a float adjustable on said stem within said reservoir; and a bypass outlet from said outlet neck directly to said reservoir and having a stop valve therein.

JAMES F. MOLLOY.